(No Model.)
J. SOSENHAMER.
ICE TONGS.
No. 414,338. Patented Nov. 5, 1889.
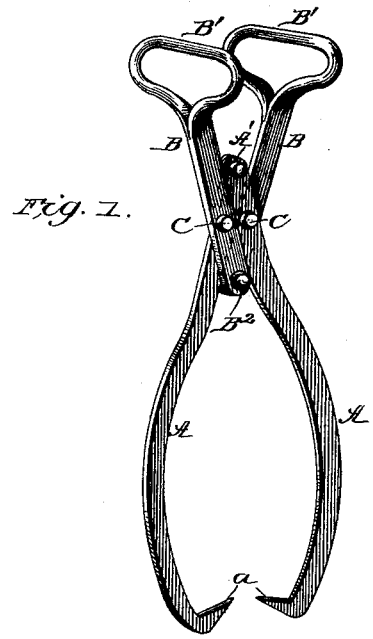
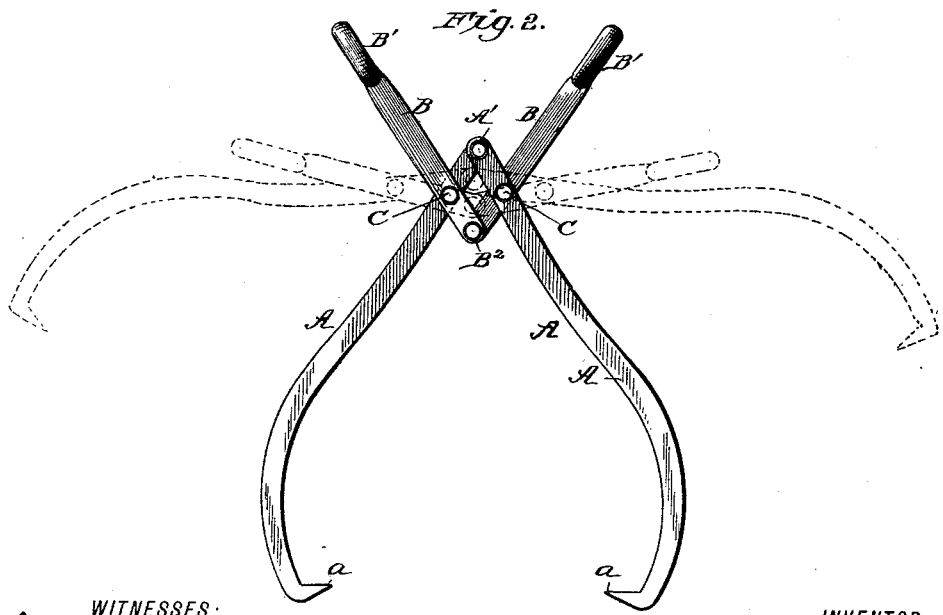

UNITED STATES PATENT OFFICE.

JOHN SOSENHAMER, OF HAMLINTON, PENNSYLVANIA.

ICE-TONGS.

SPECIFICATION forming part of Letters Patent No. 414,338, dated November 5, 1889.

Application filed March 28, 1889. Serial No. 305,198. (No model.)

*To all whom it may concern:*

Be it known that I, JOHN SOSENHAMER, of Hamlinton, in the county of Wayne and State of Pennsylvania, have invented a new and useful Improvement in Ice-Tongs, of which the following is a specification.

The invention consists in a new and improved ice-tongs, which will be hereinafter fully described and claimed.

Referring to the accompanying drawings, Figure 1 is a perspective side view of my new and improved ice-tongs, showing the same closed; and Fig. 2 is a plan view showing the tongs partially opened, and also in dotted lines showing them opened to their widest extent.

The same letters of reference indicate corresponding parts in both the figures.

Referring to the several parts by letter, A A indicate the two arms of my new ice-tongs, which are formed at their lower ends with the usual inwardly-extending points $a$, but are pivoted together at their straight upper ends at A'. The straight handles B B are formed at their free upper ends with the usual flattened rings B', by which the tongs are handled, but are pivoted together at their flat lower ends at B². The handles B are then pivoted to the arms A at C C, these pivotal points C being at equal distances from the pivoted upper ends of the arms A and the pivoted lower ends of the handles B, as shown in the drawings.

The result and great advantages obtained by thus pivoting the lower ends of the handles and the upper ends of the arms, respectively, together at their extremities, and then pivoting the arms and handles together at points C beyond their pivoted ends, are that a slight movement of the handles will give a wide or greatly-increased movement of the arms A, which will greatly increase the rapidity and efficiency of the tongs in use, while when the handles are separated to their farthest extent the arms A will be separated far more widely than is possible where the handles are integral with the arms, as ice-tongs are at present made. This can be readily seen by reference to the dotted lines in Fig. 2. It will further be seen that by pivoting the handles and arms together, as here shown, the arms A will not be projected forward or drawn back as the handles are opened and closed, which would inconveniently occur were they pivoted together like lazy-tongs, as will be readily understood, especially by reference to Fig. 2 of the drawings.

From the foregoing description, taken in connection with the accompanying drawings, the construction, operation, and advantages of my invention will be readily understood.

It will be seen that my tongs are strong, simple, and cheap in construction, and very efficient and satisfactory in their operation.

Having thus described my invention, what I claim, and desire to secure by Letters Patent, is—

1. The combination of the arms pivoted together at their upper ends and the handles pivoted together at their lower ends and pivoted to the arms, substantially as set forth.

2. The combination of the arms having the points at their lower ends and pivoted together at their upper ends and the handles having the flattened rings at their upper ends, pivoted together at their lower ends, and pivoted to the arms, substantially as set forth.

JOHN SOSENHAMER.

Witnesses:
LEONARD WATSON,
SAMUEL ADAMS.